Feb. 13, 1951  B. W. VAN KIRK  2,541,847
FISH LURE
Filed July 8, 1949

INVENTOR.
Bradley W. Van Kirk
BY
ATTORNEYS

Patented Feb. 13, 1951

2,541,847

UNITED STATES PATENT OFFICE 2,541,847

FISH LURE

Bradley W. Van Kirk, Canton, Ohio

Application July 8, 1949, Serial No. 103,640

4 Claims. (Cl. 43—41)

The invention relates generally to artificial lures or baits for fishing, and more particularly to a lure which utilizes a captive live bait.

A great many types and styles of artificial lures have been tried out with varied degrees of success in catching fish, but in general no artificial lure has been as satisfactory for all-around purposes as a live natural bait.

Certain prior lures have employed a wire cage or a glass enclosure for a captive live bait, but the wire cage detracts from the natural appearance of the live bait, and the glass enclosure is usually either easily breakable or heavy and cumbersome.

With either the wire cage or glass enclosure it is usually an awkward and tedious operation to unfasten the catch for the cage or enclosure in order to insert or remove the live bait, and this is particularly true when the lure has become corroded or encrusted due to continued use in the water. Moreover, certain of the glass enclosures do not provide sufficient circulation of fresh water therethrough, and the captive live bait soon dies.

It is an object of the present invention to provide a novel artificial lure which employs a captive live bait and overcomes the disadvantages of prior lures of this type.

Another object is to provide a novel artificial lure having a transparent enclosure for a captive live bait.

A further object is to provide a novel lure having a transparent enclosure which permits free circulation of water through the enclosure and allows a captive bait to swim and move about within the enclosure.

Another object is to provide a novel transparent enclosure which can be manipulated solely by pressure of the fingers to permit the insertion or removal of a live bait.

A still further object is to provide a novel lure which has a transparent enclosure permitting free circulation of water therethrough, and which does not require any catch for permitting insertion or removal of a captive live bait.

These and other objects are accomplished by the parts, constructions and arrangements comprising the present invention, a preferred embodiment of which is shown by way of example in the accompanying drawing illustrating the best known mode of carrying out the invention, said embodiment being described in detail in the accompanying specification, and the scope of the invention being defined in the appended claims forming part hereof.

In general terms, the novel lure comprising the present invention consists of a pointed nose and a pointed tail, each preferably made of a plastic material, and being connected to the ends of a series of longitudinal transparent slats, the slats being circumferentially spaced to form a cage for a captive live bait, while permitting free circulation of water through the cage, and the slats being flexible so that when the nose and tail are pressed toward each other the slats bow outwardly, thus increasing the spaces therebetween to permit the insertion or removal of a captive live bait.

Referring to the drawing forming part hereof, in which a preferred embodiment of the invention is shown by way of example:

Similar numerals refer to similar parts throughout the several views of the drawing.

Figure 1:
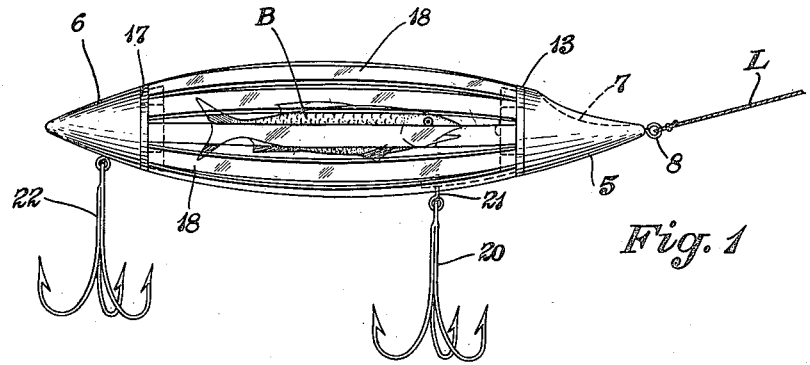
Figure 1 is a side elevation of the novel artificial lure of the present invention, with a captive live bait positioned within the transparent cage portion thereof.

The artificial lure of the present invention includes a head or nose piece 5 which is preferably tapered or pointed as shown, and a tail piece 6 which may be similarly tapered or pointed. The head and tail pieces may be molded of a suitable plastic material, such as Lucite, which is light in weight. Preferably the upper surface of the nose piece is provided with a groove or recess 7 which is designed to give a vibrating action to the lure when it is pulled through the water. As shown, the nose piece has an eye 8 at its front end for attachment to a line L, and the eye may be formed on the end of a shank 9 which extends axially through the nose piece and is riveted or upset at its rear end 10.

The nose piece 5 preferably has a reduced cylindrical extension 11 at its rear end, and an annular collar 12 may be secured thereon by means of a suitable adhesive cement. The collar 12 may have an exterior annular flange forming a shoulder 13 thereon and a rear projection 14 on its bottom portion.

The tail piece 6 is similarly formed with a reduced cylindrical extension 15 on which an annular collar 16 is cemented, and the collar has an exterior annular flange 17 similar to the flange 13 on the front collar 12.

A series of circumferentially spaced transparent slats 18 extends longitudinally between the head piece and tail piece, and the ends of the slats are preferably secured on the collars 12 and 16 abutting the flanges 13 and 17 respectively, preferably by cementing the ends of the slats to the collars. The slats are preferably made of transparent plastic material such as Lucite. Thus the circumferentially spaced slats form a slotted cage or an openwork transparent enclosure between the nose piece and tail piece, in which a live bait B may be held captive and is clearly visible at all times.

Figures 4, 5:
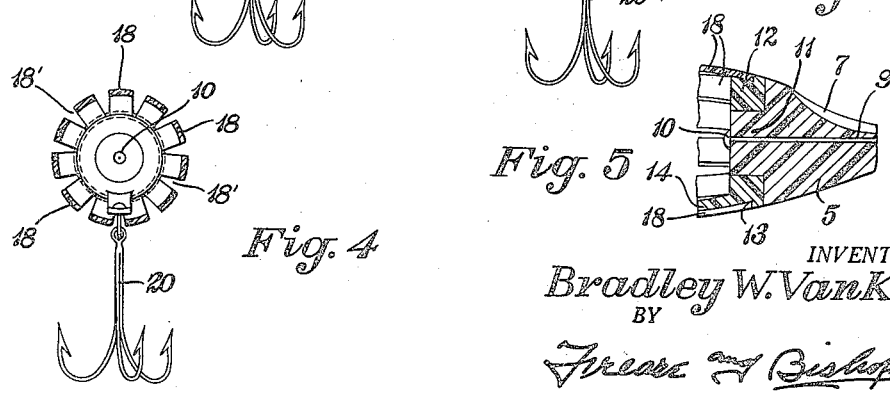
Fig. 4 is a transverse sectional view thereof.

The spaces 18' between the slats 18 are such as to allow free circulation of water through the enclosure at all times, as best shown in Fig. 4, so that a small minnow B can move about and swim within the enclosure as the bait is pulled through the water, thereby presenting an attractive lure to a larger fish. Because of the free circulation of the water through the enclosure, the bait B will remain alive over a long period and will be protected from injury by a larger fish because of the transparent slats 18.

A gang of fish hooks 20 may be attached in a usual manner to the rear projection 14 on the collar 12, as by a rivet 21, and a similar gang of hooks 22 may be attached in a usual manner to the tail piece 6. These two gangs of hooks are normally sufficient to catch fish which strike at the lure as it is pulled through the water.

Figure 2:
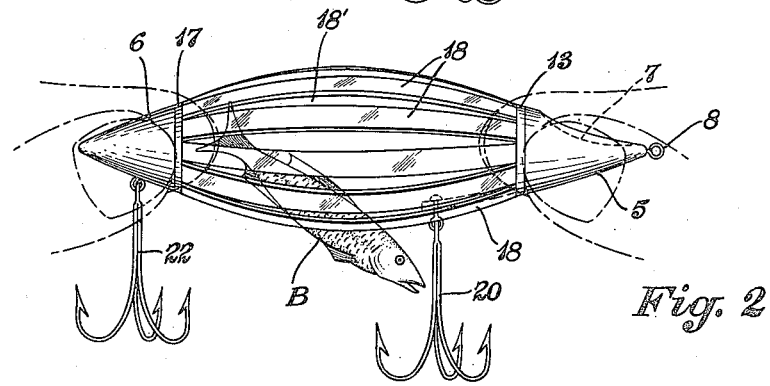
Fig. 2 is a side elevation showing the manner of pressing the ends of the artificial lure toward each other to bow the transparent slats outwardly and permit the insertion or removal of a captive live bait.
Figure 3:
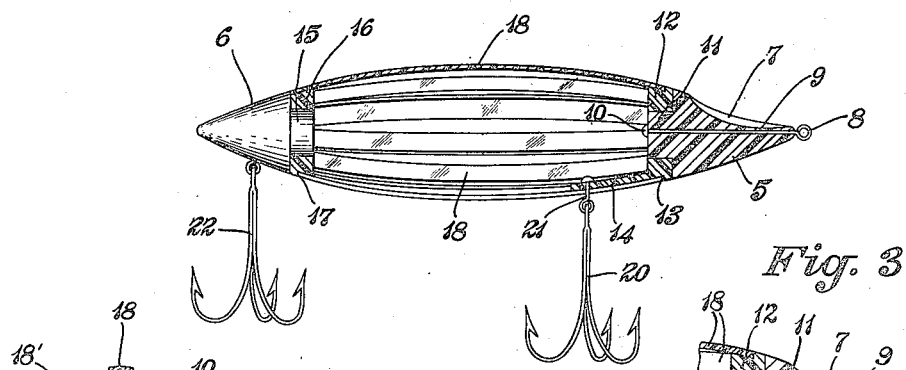
Fig. 3 is a longitudinal sectional view of the novel lure.

In order to permit insertion or removal of a live bait such as B, the slats 18 are made thin enough to be flexible and are convexly curved, so that the spaces 18' between next adjacent slats may be temporarily widened merely by compressing the lure axially with the fingers in the manner indicated in dot-dash lines in Fig. 2. In other words, by grasping the nose and tail pieces and pressing them toward each other, the slats 18 will bow outwardly, thereby sufficiently widening the spaces 18' so that the bait can be inserted or removed through one of the spaces between the slats. The plastic material of which the slats 18 are made is sufficiently resilient to permit repeated bowing of the slats in a radially outward direction, as indicated in Fig. 2, to replace the captive live bait B.

Accordingly, the novel lure has the durability of an artificial lure and yet possesses the attraction of a natural live bait. Moreover, it provides for inserting or removing the live bait without unfastening any catch which might become corroded or encrusted in use, and the appearance of the live bait is not detracted from by the slats forming the enclosure, because they are transparent.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

I claim:

1. A fish lure including a head piece, a tail piece and a series of circumferentially spaced convexly curved transparent slats connecting said head and tail pieces and forming an enclosure for a captive live bait while permitting free circulation of water through said enclosure, said slats being flexible so as to bow outwardly when the head and tail pieces are pressed toward each other, thereby increasing the spaces between the slats to permit insertion or removal of a live bait.

2. A fish lure including a pointed nose piece having a rear projection at its bottom portion, a tail piece, a series of circumferentially spaced convexly curved transparent slats connecting the nose and tail pieces and forming a slotted enclosure for a captive live bait, said slats being flexible to bow outwardly in response to axial compressive force applied to the nose and tail pieces, a fish hook secured to the bottom of said tail piece, and a fish hook secured to said rear projection of the nose piece.

3. A fish lure including a pointed nose piece, a tail piece longitudinally spaced therefrom, and a series of circumferentially spaced convexly curved transparent slats connecting said nose and tail pieces and forming a cage for a live bait, said slats being flexible to bow radially outward in response to axial compressive force applied to said nose and tail pieces, and a hook secured to said tail piece.

4. A fish lure including a pointed nose piece having a recess in its upper surface, a tail piece spaced longitudinally from said nose piece, an annular collar on each of said nose and tail pieces, and a series of circumferentially spaced convexly curved transparent slats secured at their ends to said nose piece and tail piece collars and forming a cage for a captive bait, said slats being flexible to bow outwardly in response to endwise compressive force applied to said nose and tail pieces, thereby increasing the spaces between the next adjacent slats to permit insertion and removal of a live bait.

BRADLEY W. VAN KIRK.

REFERENCES CITED

The following references are of record in the file of this patent:

UNITED STATES PATENTS

| Number | Name | Date |
|---|---|---|
| 556,494 | Dales | Mar. 17, 1896 |
| 987,145 | Leisinger | Mar. 21, 1911 |
| 2,198,043 | Scogland et al. | Apr. 23, 1940 |